E. TAYLOR.
CULTIVATING AND COVERING ATTACHMENT FOR CORN PLANTERS.
APPLICATION FILED FEB. 4, 1919.
1,317,402. Patented Sept. 30, 1919.
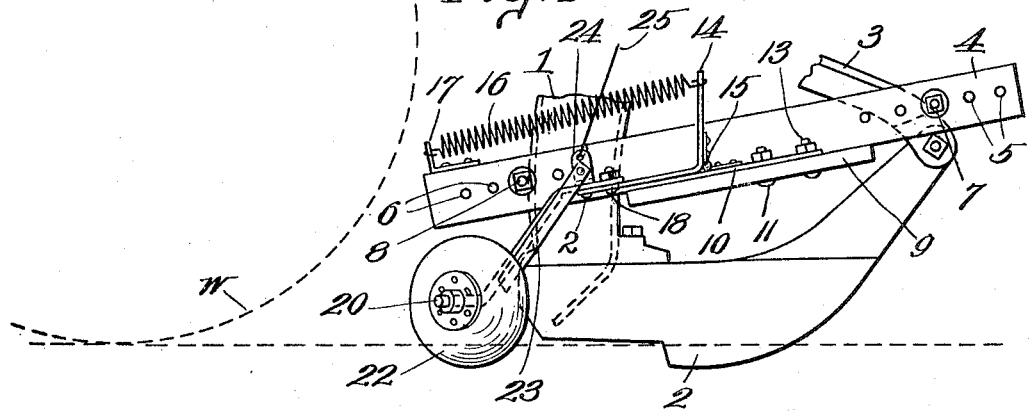
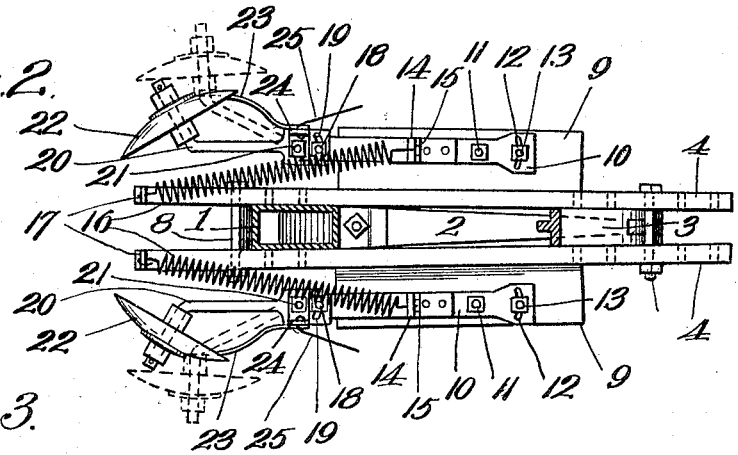
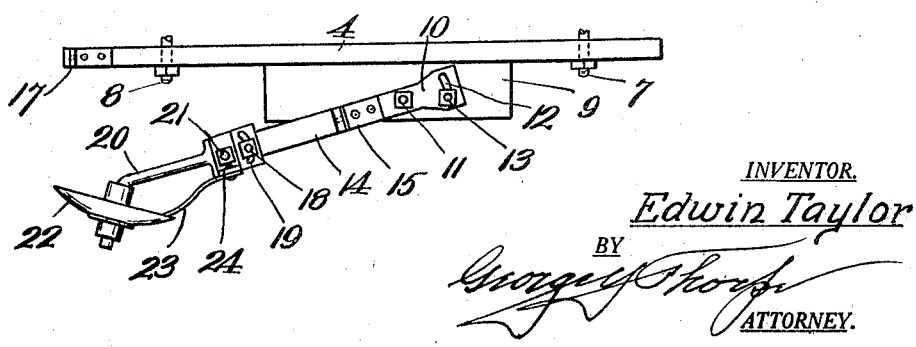
INVENTOR.
Edwin Taylor
BY
ATTORNEY.

UNITED STATES PATENT OFFICE.

EDWIN TAYLOR, OF EDWARDSVILLE, KANSAS.

CULTIVATING AND COVERING ATTACHMENT FOR CORN-PLANTERS.

1,317,402.   Specification of Letters Patent.   Patented Sept. 30, 1919.

Application filed February 4, 1919. Serial No. 275,270.

*To all whom it may concern:*

Be it known that I, EDWIN TAYLOR, a citizen of the United States, residing at Edwardsville, in the county of Wyandotte and State of Kansas, have invented certain new and useful Improvements in Cultivating and Covering Attachments for Corn-Planters, of which the following is a specification.

This invention relates to cultivating and covering attachments for corn planters, and has for its object to produce an efficient attachment of this character susceptible of quick and easy attachment to any of the standard types of corn planters and adjustable to operate at different depths and distances from and at different angles to the seed furrow to accommodate the depth of the latter and the character or condition of the soil, adjustments of the cultivating and covering blades being essential to insure that the grains of corn shall lie at a distance below the surface found by experience to best promote the germination of the seed corn.

A further object is to produce an attachment having cultivating and covering blades adapted to trip over ordinary obstructions without sustaining injury and capable of being lifted to inoperative position while the machine is being turned at the end of a row. Another object is to provide wings for the support of certain pivotal connections of the operative part of the attachment and for the protection of such connections from entanglement with stubble or trash over which the machine may pass. A still further object is to produce an attachment of simple, strong, durable and inexpensive construction composed of parts carried in stock by any hardware or implement store.

With these objects in view the invention consists in certain novel and useful features of construction and organization of parts as hereinafter described and claimed; and in order that same may be fully understood reference is to be had to the accompanying drawing, in which:

Figure 1, is a side elevation of a part of a corn planter equipped with an attachment embodying the invention.

Fig. 2, is a plan view of the same.

Fig. 3, is a plan view of part of the attachment in a different position of adjustment—as when operating in loose soil as distinguished from the position shown in Fig. 2, which shows an adjustment suitable for more tightly or densely packed soil.

In said drawing, 1 indicates the seed chute, 2 the runner, and 3 the customary brace for said parts, of an ordinary or any preferred type of corn planter, the position of the wheel for compressing the soil covering the seed as hereinafter referred to, being indicated by the dotted lines W.

Referring now to the attachment for each chute and runner, one only being shown, 4 indicates a pair of bars arranged or fitted against opposite sides of the seed chute and brace, the bars being pitched downwardly and rearwardly at a slight angle and provided at their front and rear ends with longitudinal series of holes 5 and 6, any one of series 5 being adapted for the reception of a transverse clamping bolt 7, and of the series 6 for a transverse clamping bolt 8. Preferably the bars 4 are of wood so that they may be clamped firmly in place, but to guard against disarrangement of the clamp as a whole in the event the clamping bolts loosen, bolt 7 is adapted to rest upon the brace 3 and bolt 8 to bear against the rear side of the said chute. The series of holes 5 and 6 provide for an adjustment which permits the bolts to be positioned as stated and accommodate the application of the attachment to planters in which the seed chutes and front ends of the braces are spaced variable distances apart. I have found from experience, however, that the clamp may be applied to other fixed parts of some corn planters and I therefore do not wish to restrict myself to the application of the clamp solely to the said chute and runner construction.

Each member 4 of the clamp is provided at its lower edge with an outwardly projecting wing 9, and fitted upon said wings are longitudinally extending plates 10 pivoted intermediate their length as at 11, and provided at their front ends with arcuate slots 12 struck from the pivotal points 11, and engaged by clamping bolts 13 secured to the wings.

Mounted upon the plates 10 rearward of the pivotal points thereof is a pair of angle brackets 14, and said brackets are hinged as at 15 to said plates so as to be capable of swinging movement in a vertical plane but incapable of any other movement independent of the pivoted plates 10. The upwardly projecting arms of the angle brackets 14 are connected by retractile springs 16 to fixed points or brackets 17 of the clamp member 4, said spring holding the brackets with their lower or rearwardly projecting arms pressed yieldingly down upon the rear portion of plates 10, which thus limit the swinging movement imparted to brackets 14 by the said retractile springs.

18 are clamping devices mounted in the rear or lower arms of the hinged brackets 14, and engaging arcuate slots 19 in the upper or front ends of angle arms 20, which arms are secured by pivotal clamping devices 21 to said hinged brackets 14, rearward of slots 19.

The arms 20 constitute supports for cultivating and covering blades, the blades in this instance being shown in the form of disks 22 journaled upon the rear ends of arms 20 and standing in forwardly diverging relation normally for turning the soil inward or toward the said furrow to be covered, the attachment, of course, traveling astride the said furrow. To keep the inner sides of the disks cleaned, scrapers 23 are employed, their lower or free ends engaging the disks and their upper ends being secured to upstanding ears 24 upon the upper ends of the arms 20, which ears also afford points of attachment for lift rods 25 adapted to be manually raised to lift the cultivating blades or disks out of the ground when the machine is to be turned at the end of a row, it being obvious also that should the cultivator blades encounter an ordinary obstruction they may individually or together be raised over the obstruction, as the springs 16 will yield to permit of such tripping action and will then return the cultivating blades to operative position.

For operation in dense or closely packed soil, it is usually desirable to dispose the blades as close as possible to the seed furrow produced in the ground by the runner 2, and to accomplish such purpose pivotal adjustment of the arms 20 is resorted to, it also being secured at the desired point of adjustment by the clamping devices 18, this action of course incidentally changing the pitch or angle of the blades to the line of draft. Where the machine is to be operated in loose soil, it is ordinarily desirable to dispose the disks at a greater distance apart, and in this event pivotal adjustment of the plates 10 is resorted to as indicated by Fig. 3, the plates being secured at the desired angle by the clamping devices 13. If the adjustment is such that it is necessary to change the pitch or angle of the disks in order that they may effect their covering function, pivotal adjustment of arms 20 may also be made, and it is also obvious that there may be conjoint pivotal adjustment of plates 10 and arms 20 to dispose the disks at the proper distance apart and at the proper pitch when the machine is to operate in dense or closely packed soil.

It will be noted that with the attachment construction as described, the wings 9 have the dual function of a support for certain operative parts of the mechanism and also serve to protect the joints of certain of said parts against conflict with stubble, trash and weeds which might by entanglement therewith, interfere with the free and proper operation of the blades, it being, of course, apparent that the blades themselves will readily crush through or over-ride obstructions or trash which may lie in their paths.

From the above description it will be apparent that I have produced a cultivator and covering attachment for corn planters and the like, embodying the features of advantage enumerated as desirable in the statement of the objects of the invention, and it is susceptible of modification in some particulars without departing from the principle of construction and mode of operation described and the spirit and scope of the appended claims.

I claim:

1. The combination of a corn planter, an attachment comprising members secured to a fixed part of the machine at opposite sides of the seed chute and runner thereof, wings projecting outward from said members, longitudinally-extending plates pivotally adjustable laterally with respect to said members and overlying said wings, brackets hinged for vertical movement to said plates, arms secured to and extending downwardly and rearwardly from said brackets, soil turning devices secured to the rear ends of said arms, and means for yieldingly holding said soil turning devices in a depressed position.

2. The combination of a corn planter, an attachment comprising members secured to a fixed part of the machine at opposite sides of the seed chute and runner thereof, wings projecting outward from said members, longitudinally-extending plates pivotally adjustable laterally with respect to said members and overlying said wings, brackets hinged for vertical movement to said plates, arms secured to and extending downwardly and rearwardly from said brackets, soil turning devices secured to the rear ends of said arms, means for yieldingly holding said soil turning devices in a depressed position, and means for manually lifting said soil turning devices.

3. The combination of a corn planter, an attachment comprising members secured to a fixed part of the machine at opposite sides of the seed chute and runner thereof, wings projecting outward from said members, longitudinally-extending plates pivotally adjustable laterally with respect to said members and overlying said wings, brackets hinged for vertical movement to said plates, arms pivoted for lateral adjustment to and extending downward and rearward from said plates, soil turning devices carried by said arms, and a yielding means for holding said hinged brackets with said soil turning devices in depressed position.

4. The combination of a corn planter, an attachment comprising members secured to a fixed part of the machine at opposite sides of the seed chute and runner thereof, wings projecting outward from said members, longitudinally-extending plates pivotally adjustable laterally with respect to said members and overlying said wings, brackets hinged for vertical movement to said plates, arms pivoted for lateral adjustment to and extending downward and rearward from said plates, soil turning devices carried by said arms, a yielding means for holding said hinged brackets with said soil turning devices in depressed position, and lift rods connected for swinging said brackets to lift the soil turning devices to inoperative position.

5. The combination of a corn planter, of a pair of members extending longitudinally of and clamped against opposite sides of a fixed part of the planter and each provided with an outwardly projecting and downwardly and rearwardly sloping wing, plates extending longitudinally of and upon said wings and pivoted thereto near their front ends, clamping devices engaging the plates and wings to limit pivotal adjustment of the former and secure the same at the desired points of adjustment, angle brackets hinged to and resting upon said plates rearward of the pivotal points thereof, retractile springs connecting said brackets to fixed points of said clamping members to hold the brackets pressed flatly down upon said plates, angle arms pivoted flatly for lateral adjustment, to said angle brackets, clamping devices for limiting the pivotal adjustment of said angle arms and for clamping the same rigidly to said angle brackets, and soil turning devices carried by said arms and disposed for turning soil inward.

6. The combination with a corn planter, of a pair of members extending longitudinally of and clamped against opposite sides of a fixed part of the planter and each provided with an outwardly projecting and downwardly and rearwardly sloping wing, plates extending longitudinally of and upon said wings and pivoted thereto near their front ends, clamping devices engaging the plates and wings to limit pivotal adjustment of the former and secure the same at the desired points of adjustment, angle brackets hinged to and resting upon said plates rearward of the pivotal points thereof, retractile springs connecting said brackets to fixed points of said clamping members to hold the brackets pressed flatly down upon said plates, angle arms pivoted flatly for lateral adjustment, to said angle brackets, clamping devices for limiting the pivotal adjustment of said angle arms and for clamping the same rigidly to said angle brackets, soil turning devices carried by said arms and disposed for turning soil inward, scrapers adjustable with said angle arms and engaging the soil turning devices, and lift rods connected for swinging said angle brackets to effect upward movement of said soil turning devices against the resistance of said springs.

In testimony whereof I affix my signature.

EDWIN TAYLOR.

Copies of this patent may be obtained for five cents each, by addressing the "Commissioner of Patents, Washington, D. C."